Figure 1:
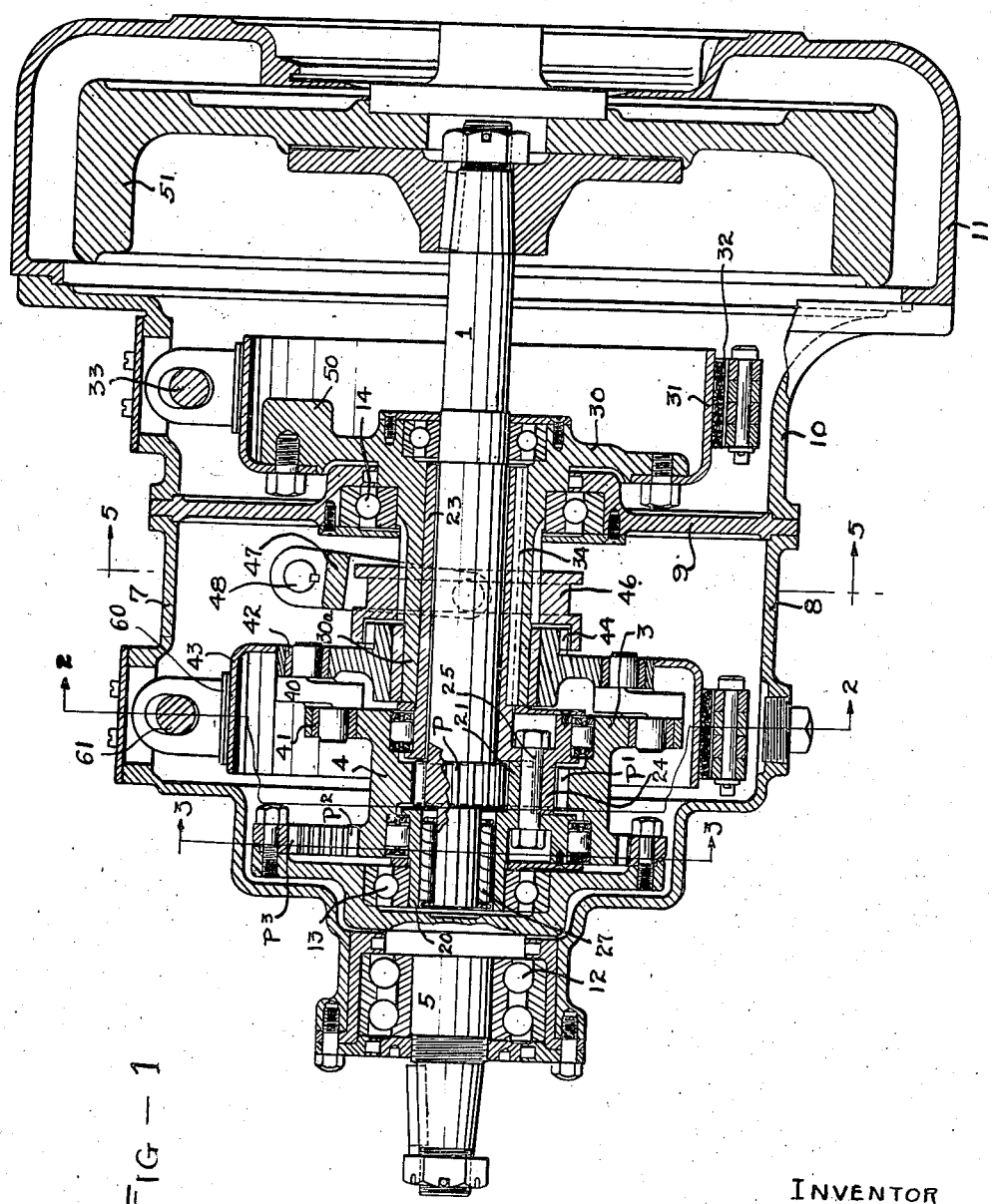

March 15, 1927.  1,620,856
C. E. F. AHLM
TRANSMISSION GEARING
Filed Dec. 30, 1924   3 Sheets-Sheet 1

INVENTOR
Charles C. F. Ahlm
By Bates, Macklin
Goldrich & Teare
ATTORNEYS

March 15, 1927.

C. E. F. AHLM 1,620,856

TRANSMISSION GEARING

Filed Dec. 30, 1924

3 Sheets-Sheet 2

INVENTOR
Charles E. F. Ahlm
By Bates, Macklin
Goldrich, & Teare.
ATTORNEYS

March 15, 1927.  1,620,856

C. E. F. AHLM

TRANSMISSION GEARING

Filed Dec. 30, 1924   3 Sheets-Sheet 3

INVENTOR
Charles E. F. Ahlm
By Bates, Macklin,
Goldrick & Teare
ATTORNEYS

Patented Mar. 15, 1927.

1,620,856

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 30, 1924. Serial No. 758,942.

This invention relates to transmission gearing such for example as are used to connect driving and driven members, as the engine shaft and the rear axle or propeller shaft of an automobile to secure a plurality of speeds and a reverse drive between these members.

The general object of this invention is to provide a simple and compact form of changing speed gearing mechanism employing an eccentrically mounted composite gear which may be easily and cheaply manufactured and assembled, the parts of which are of light weight, while being capable of transmitting a great amount of power. A further object is to arrange a gearing of this character so that the relatively rotating parts may be very simply connected together as a unit when direct drive is desired.

Another object may be stated to include the provision of an eccentric bearing for a composite internal-external gear which may be very easily assembled with a drive shaft and pinion irrespective of the character of the construction of these parts.

The gearing herein disclosed employs the general principles of the gearing shown described and claimed in my copending application filed December 30, 1924, Serial No. 758,940, which is essentially a gearing connection between driving and driven members including an eccentrically mounted internal-external gear member having a geared connection with the driving member and having also a gear connection with the propeller member. This prior application also includes means for connecting the driving shaft to the eccentric bearing whereby all of the gear members are tied together so as to rotate as a unit when direct drive is desired. It also includes retarding the rotation of the internal-external gear while permitting it a revolving movement to secure a low reverse speed or a very low forward speed depending upon the gear relations. In the present invention, I propose to use any method for preventing or retarding the rotating movement of the composite gear, that shown in the drawings however, employing the use of a series of cranks pivoted to the composite gear at one end and to an idler member at the other and offset a distance corresponding to the amount of eccentricity of the bearing for the gearing. Thus when the member to which the cranks are secured is held against rotation the composite gear is still allowed to revolve with the eccentric.

The arrangement includes other features such as simplifying the various clutching mechanism whereby the cost of manufacturing the gearing may be decreased. For example, the earlier application provided means for partially synchronizing the speed of the driving shaft and that of the eccentric by a centrifugally operated clutch previous to positively coupling the two members together to secure direct drive. In the present case, the means employed for locking all the members together is simplified and generally consists of clutching the eccentric bearing to the composite gear member and thus preventing relative rotation and consequently any reduction of speed. Provision may be made for partially equalizing or synchronizing the speed of the relatively moving member before positively clutching them together if desired, similar to that of the former embodiment.

Other features will become apparent in the following description which relates to the accompanying drawings wherein I have shown the preferred embodiment of my invention. The essential characteristics will be summarized in the claims.

Figure 2:
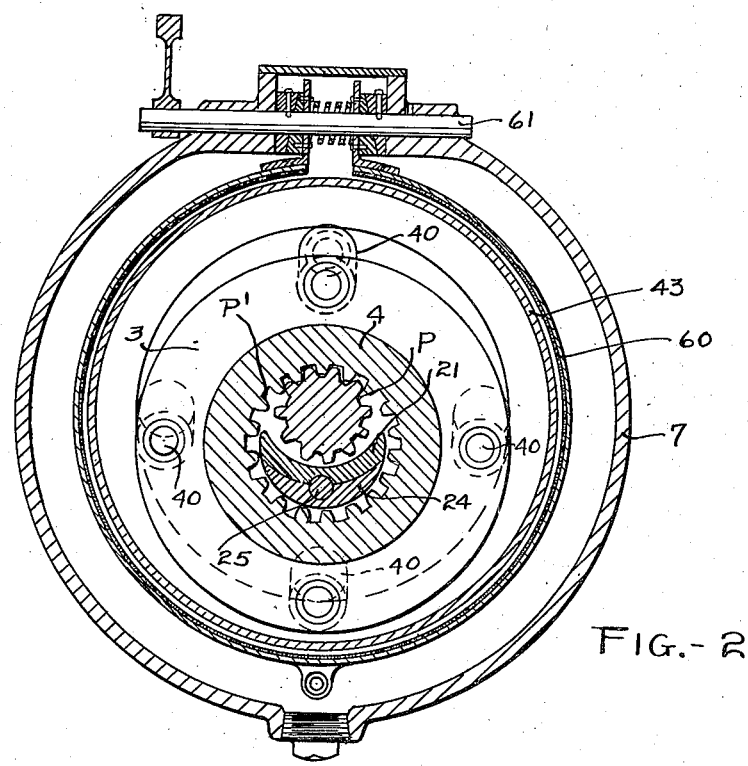
Figure 3:
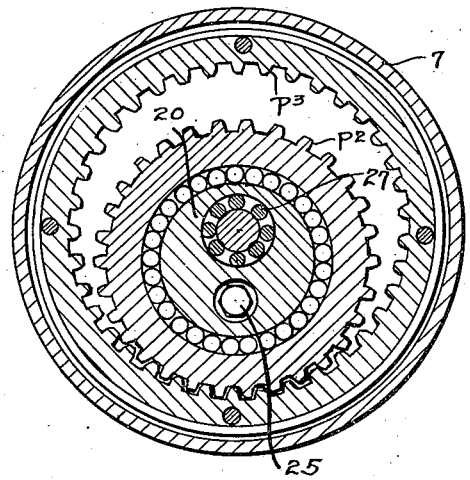
Figure 5:
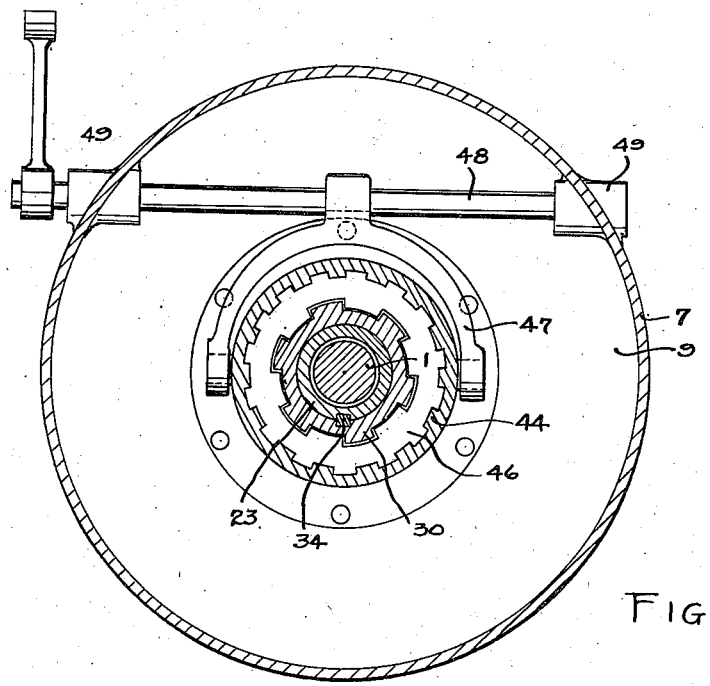
Figure 4:
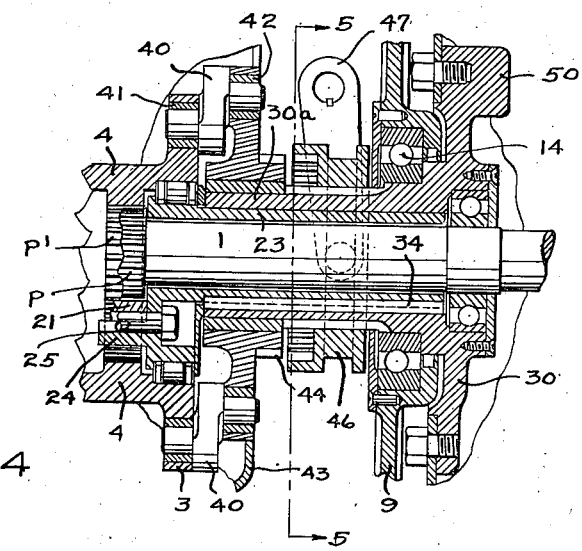

In the drawings Fig. 1 is a substantially axial longitudinal section through my transmission; Fig. 2 is a transverse section at right angles thereto as indicated by the lines 2—2 on Fig. 1; Fig. 3 is a similar section as indicated by the lines 3—3 on Fig. 1; Fig. 4 is a fragmentary section of part of the mechanism similar to Fig. 1 and showing a different relation of some of the elements; Fig. 5 is a transverse section taken along the line 5—5 of Fig. 1.

Referring in detail to the drawings and indicating the various parts by numerals or letters, 1 indicates the driving shaft having a pinion P rigid therewith and meshing with an internal gear of larger diameter indicated at $P^1$. The internal gear forms part of a composite gear member 3 having an eccentric bearing member 4. The member 3 has also external gear teeth at $P^2$ which mesh with internal gear teeth $P^3$ on the driven member or propeller shaft 5. Suitable bearings are provided for these members in a casing indicated generally at 7 comprising a rearward portion 8, a bearing supporting web or partition 9 and forward sections 10 and 11 adapted to be secured to the engine or bell housing of the usual construction. The propeller or driven member is shown as carried by roller bearings 12 in the rearward end of the casing while the rear end of the driving shaft as well as the eccentric bearing and composite gear may be also supported indirectly by these bearings through roller bearings 13 carried by the propeller gear member. The driving shaft is supported at the other end by rollers 14 carried by the support 9.

One of the features of this invention is the arrangement whereby I provide a rigid support for the composite gear at either side of the zone of engagement of the pinion and internal teeth of the composite gear member. By the arrangement shown the bearing and the associated parts may be very easily assembled, even though the pinion is made, as shown, an integral part of the driving shaft. This will be apparent from Fig. 1 in which it will be seen that the rearward end of the eccentric bearing member has a tubular portion 20, and a lune shaped body portion 21 shown best in Fig. 2 which lies between the pinion teeth and the gear P$^1$ diametrically opposite the tangent point of the two gears. The forward end of the eccentric is tubular as at 23 and has a somewhat similar body portion projecting through from the opposite direction and lying against the lune shaped portion 21 as at 24. One or more pins or bolts may be provided as at 25 for securely holding the two parts of the eccentric member together. Thus to assemble the eccentric onto the shaft, the two sleeve-like portions may be slid toward each other from opposite ends of the shaft. The bearing as shown is provided with roller bearings 27 at the rearward end.

For the first speed reduction the eccentric is held rigid with the casing, and to effect this a member 30 having a braking surface 31 and being provided with a cooperating brake band 32 operable from a shaft 33 extending into the casing, is made rigid with the eccentric members as by means of a key or spline 34, when the brake is applied and the eccentric held the reduction is the compound reduction between the gears P and P$^1$, and P$^2$ and P$^3$.

The composite gear member as heretofore mentioned is provided with cranks 40 having their pivots offset a distance corresponding to the degree of eccentricity of the bearing for the composite gear. The cranks may be arranged as shown in Fig. 2 about the exterior of the composite gear and supported at one end in gear 41 extending therefrom and at the other by a member 42 rigid with a brake member 43 shown as freely journaled on a rearward extension 30$^a$ of the member 30. I have shown a cooperating brake member 60 arranged to be operated by a rock shaft 61 for holding the member 43 against rotation. The composite gear is consequently held against rotation by reason of the cranks permitting only a revolving movement of the gear. The result of this arrangement is that when the brake is operated the driven member is rotated at a slow reverse speed as will be hereinafter more fully explained. The mechanism for effecting the synchronous rotation of the driving and driven shafts 1 and 5 consists of means for connecting the braking member 43 to the member 30. I preferably provide clutch teeth 44 rigid with the member 43 and adapted to mesh with the complementary teeth of a clutch collar 46. The collar may be operated in the usual manner by a bifurcated arm 47 carried by a shaft 48 and journaled in the casing in bearings 49 as shown in Fig. 5. By this means, I am enabled to hold the braking member 43 rigid with the braking member 30 and hence also rigid with the eccentric bearing. Thus when direct drive is desired, the collar 46 is thrown rearwardly from its normal position illustrated in Fig. 4 to its clutching position as shown in Fig. 1, locking the eccentric bearing and the composite gear, together and effectually preventing the rotating movement of the composite gear and consequently reduction of speed.

When the reverse is desired, the clutch collar 46 assumes its normal position and the brake 60 is applied to hold the member 43 relatively stationary, preventing rotating movement of the composite gear but permitting it to revolve about the eccentric bearing which is now spinning backwardly to permit the revolving movement of the gear. The eccentric rotates in a reverse direction to that of the rotation of the driving shaft carrying with it the composite gear, and the gear P$^2$ imparts to P$^3$ a still further reduced reverse movement.

In connection with my previously filed application above referred to the various speeds of the members has been described in detail with assumed ratios of gearing. One of the embodiments (Fig. 2) of that case corresponds substantially with that shown in the drawing of the present application. The speed relations given below are therefore the same for this case.

When the eccentric bearing is held as above described and with an assumed engine shaft speed of 600 R. P. M. the forward speed is found to be 272.3. The reverse speed accomplished as above explained by the creeping backward movement of the composite gear while allowing the eccentric to turn freely backwardly, is found to be 186.5. These speed combinations are very practical from the standpoint of wear on the mechanism as well as for the usual traffic requirements.

It is to be understood that the particular gear relations shown are merely illustrative, and for an illustration of different forms embodying the same principles as herein set out, I refer to my copending application above mentioned.

The unbalance of the eccentric is compensated by a counterweight 50 shown as part of the member 30 within the eccentric holding braking members 31. The location of this counterweight may of course be changed within the spirit of my invention to attain a better dynamic balance of the rotating parts. In this embodiment I have shown a fly wheel 51 keyed to the driving shaft 1 and adapted to be connected with the engine shaft, all within the general casing for my gearing. This and other details of construction above set out I do not recognize as essential and I do not wish to be precluded from my right to manufacture and prevent others from manufacturing any mere mechanical equivalent of the combination herein set forth.

Having thus described my invention, I claim:

1. In a transmission gearing in combination a driving member, a gear rigid therewith, a rotatable and revoluble composite gear member having a plurality of sets of teeth rigid with each other, said gear member being in offset axial relation to the driving member and having one set of teeth in mesh with the gear thereof, a driven member and a gear rigid therewith meshing with another of said sets, means for retarding the rotating movement of the gear member but permitting a revolving movement thereof for imparting a low speed to the driven member, a bearing for said gear member independent of the driving member, adapted to rotate idly when said retarding means is operating and means for connecting said bearing to said retarding means whereby said bearing and said composite gear member rotate as a unit for securing another speed of the driven member.

2. In a transmission gearing in combination a driving member, a rotatable and revoluble internal-external gear in offset axial relation thereto and having a geared connection therewith, a driven member having a geared connection with said internal-external gear, means for retarding the rotating movement of the internal-external gear but permitting the revolving movement thereof for imparting a low speed to the driven member, a bearing for said internal-external gear mounted to rotate relative to the driving member and adapted to so rotate when said retarding means is operating, and clutching means for connecting said bearing to said retarding means whereby said bearing and said internal-external gear member rotate as a unit to effect a change of speed of the driven member.

3. In a gearing of the class described, a driving member, a pinion carried thereby, an internal-external gear in mesh with said pinion, an eccentric bearing therefor, a driven member having a geared connection with said internal-external gear, means for holding the composite gear member against rotation while permitting it to revolve about the eccentric bearing, a braking member rigid with the eccentric bearing for holding the bearing against rotation relative to the driving member, and means comprising a clutch collar in splined relation to the braking member capable of being shifted to clutch the braking member to said holding means whereby all of the members may be rotated as a unit to secure direct drive.

4. In a gearing in combination a driving member having a pinion, a composite gear member in mesh with said pinion, an eccentric bearing for said gear member capable of independent and synchronous rotation relative to the driving member, a driven member having a geared connection with said composite gear, means for holding said composite gear against rotation while permitting it to revolve upon the eccentric bearing when the bearing is free to rotate independently and means for rigidly connecting said holding means to said eccentric bearing when it is desired to rotate all of the members as a unit for direct drive.

5. In a gearing, in combination, a casing, a driving member having a pinion located therein a composite gear member in mesh with said pinion, an eccentric bearing for said gear member capable of rotation relative to the casing and independently of the driving member or of being held rigid with the casing, a driven member having a geared connection with said composite gear, means for holding said composite gear against rotation while permitting it to revolve about the eccentric bearing when the bearing is independently rotating to impart a reduced speed to the driving member, means for holding the eccentric rigid with the casing for another reduced speed, and means for rigidly connecting said first named holding means to said eccentric bearing when it is desired to rotate all of the members as a unit for direct drive.

6. In a gearing, in combination, a driving shaft, a pinion rigidly carried thereby, a hollow eccentric bearing member surrounding said shaft and comprising separate parts extending along said shaft, one forwardly and the other rearwardly from the pinion, means extending parallel to the shaft and positioned adjacent the radial ends of a portion of the pinion teeth for rigidly clamping the said parts together, a composite gear having internal teeth in mesh with said pinion and embracing said clamping means, said gear being supported by both parts of said bearing member, and a driven member having a geared connection with said composite gear.

7. In a gearing, in combination, a driving shaft, a pinion rigidly carried thereby, a hollow eccentric bearing member surrounding said shaft and comprising separate parts, one extending along said shaft forwardly and the other rearwardly from the pinion, said two parts being secured together in overlapping relation substantially opposite the radial ends of a portion of the pinion teeth and adjacent thereto, an internal-external gear in mesh with said pinion supported by both parts of said bearing member, the internal teeth thereof meshing with the pinion, and a driven member having internal teeth in mesh with the external teeth of the gear.

8. In a gearing, in combination, a driving shaft, a pinion carried thereby, a rotatable eccentric bearing member formed of a plurality of sections located exteriorly of said shaft, and extending along said shaft at both sides of said pinion, anti-friction bearings carried by said eccentric member positioned at either side of said pinion, a hollow composite gear member supported by said bearing having a plurality of sets of teeth rigid with each other, one set being of larger pitch diameter than the pinion and in mesh with and surrounding the pinion, means including connected overlapping tongues extending from respective sections of the eccentric and located between the teeth of the pinion and the teeth of said larger gear for maintaining the sections in rigid relation, a driven member having a geared connection with said internal-external gear, means for retarding the rotation of the internal-external gear while permitting the bearing member to rotate for securing a given speed relation between the shafts, and means for locking all the said elements together for securing direct drive between the shafts.

9. In a gearing, in combination, a drive shaft, a pinion formed on said shaft, a rotatable eccentric bearing member formed of a plurality of tubular sections surrounding said shaft, each section being adapted to be assembled over its respective end of the shaft, clamping means adjacent the pinion and extending around the same for securing the sections together, a composite gear member supported by said bearing and having a plurality of sets of teeth rigid with each other, one set being in mesh with the pinion and embracing both the pinion and clamping means, rolling bearings interposed between the gear and each section, rolling bearings for supporting the eccentric bearing member, one for each of the sections, and a driven member having a gear in mesh with the other gear of the composite gear member.

10. In a gearing, a shaft, a pinion carried thereby, a composite gear member having a plurality of sets of teeth rigid with each other, one set being in mesh with the pinion, an eccentric bearing for the gear, another shaft and a gear rigid with the same and meshing with another set of teeth of the composite gear, means for controlling the rotation of the composite gear while permitting it to revolve about the eccentric bearing, means for holding the eccentric bearing against rotation, means comprising a clutch member having a driving connection with the eccentric bearing and a cooperating clutch member drivingly connected with the controlling means, and means for bringing the clutch members together to couple the bearing to said controlling means whereby independent rotation of the gears and bearing is prevented for effecting direct drive between the shafts.

11. In a gearing, in combination, a shaft having a pinion, a composite gear member having a plurality of gears rigid with each other, one being in mesh with the pinion, an eccentric bearing for said gear member capable of independent and synchronous rotation relative to the shaft, another shaft, and a gear drivingly connected thereto, in mesh with a second gear of said composite gear member, means for holding the composite gear member against rotation while permitting it to revolve upon the eccentric bearing when the bearing is free for independent rotation, and means for connecting said holding means to the eccentric bearing, whereby the bearing, gears and shafts may be constrained to rotate as a unit.

In testimony whereof, I hereunto affix my signature.

CHARLES E. F. AHLM.